United States Patent
Chancel et al.

(10) Patent No.: US 8,635,382 B2
(45) Date of Patent: Jan. 21, 2014

(54) PROCESSING ARCHITECTURE

(75) Inventors: Francois Chancel, Cannes (FR); Jean-Marc Grimaud, Antibes (FR)

(73) Assignee: ST-Ericsson SA, Geneva (CH)

( * ) Notice: Subject to any disclaimer, the term of this patent is extended or adjusted under 35 U.S.C. 154(b) by 224 days.

(21) Appl. No.: 12/747,474

(22) PCT Filed: Dec. 11, 2008

(86) PCT No.: PCT/EP2008/010548
§ 371 (c)(1),
(2), (4) Date: Nov. 2, 2010

(87) PCT Pub. No.: WO2009/074327
PCT Pub. Date: Jun. 18, 2009

(65) Prior Publication Data
US 2011/0202746 A1 Aug. 18, 2011

(30) Foreign Application Priority Data
Dec. 12, 2007 (EP) .................................... 07123068

(51) Int. Cl.
*G06F 3/00* (2006.01)
*G06F 13/28* (2006.01)
*G06F 5/00* (2006.01)

(52) U.S. Cl.
USPC .................................. 710/22; 710/15; 710/58

(58) Field of Classification Search
None
See application file for complete search history.

(56) References Cited

U.S. PATENT DOCUMENTS

| 5,663,954 | A | | 9/1997 | Hakkanen |
| 5,708,850 | A | | 1/1998 | Staros |
| 5,744,741 | A | * | 4/1998 | Nakajima et al. ............... 84/622 |
| 2003/0135768 | A1 | | 7/2003 | Knee |
| 2005/0193081 | A1 | | 9/2005 | Gruber |
| 2007/0242834 | A1 | * | 10/2007 | Coutinho et al. ............ 381/71.8 |

FOREIGN PATENT DOCUMENTS

| JP | 05035693 | 2/1993 |
| JP | 8181677 A | 7/1996 |
| JP | 2003280776 A | 10/2003 |

OTHER PUBLICATIONS

PCT International Search Report, PCT/EP2008/010548, mailing date Jun. 17, 2009, 4 pages, European Patent Office, Rijswijk, NL.
Friebe, L. et al, "HiBRID-SoC: A System-on-Chip Architecture with Two Multimedia DSPs and a RISC Core", SOC Conference, 2003. Proceedings. IEEE International [Systems-On-Chip], Sep. 17, 2003, pp. 85-88.
Friebe L et al: "HiBRID-SoC: a system-on-chip architecture with two multimedia DSPs and a RISC core" SOC Conference, 2003. Proceedings. IEEE International [Systems-On-Chip ] Sep. 17-20, 2003, Piscataway, NJ, USA,IEEE, Sep. 17, 2003, pp. 85-88, XP010665537 ISBN: 978-0-7803-8182-7.

* cited by examiner

*Primary Examiner* — Zachary K Huson
(74) *Attorney, Agent, or Firm* — William J. Kubida; Peter J. Meza; Hogan Lovells US LLP

(57) ABSTRACT

The invention is directed towards a processing apparatus for a portable communication device. The apparatus includes: a central processing unit, first and second digital signal processing units, a first dual port memory unit adapted to store data shared between the central processing unit and the first digital signal processing unit, and a second dual port memory unit adapted to store data shared between the central processing unit and the second digital signal processing unit. The first dual port memory unit is adapted to store data shared between the first and second digital signal processing units without using the central processing unit.

15 Claims, 4 Drawing Sheets

PROCESSING ARCHITECTURE

This application claims the benefit of International Application No. PCT/EP2008/010548 filed Dec. 11, 2008 and European Patent Application No. 07123068.4 filed Dec. 12, 2007, both applications are incorporated by reference for all purposes as if fully set forth herein.

FIELD OF THE INVENTION

This invention relates to a processing apparatus and, more particularly, to processing apparatus for a portable communication device such as a mobile phone.

BACKGROUND OF THE INVENTION

In complex integrated circuits, processing apparatus is typically distributed over several cores or processors. Commonly, a master processor 2 (otherwise known as a central processing unit (CPU)) is dedicated to system control and one or more specialized slave processors 4 (otherwise known as digital signal processors (DSPs)) are dedicated to processing digital signals. In a portable communication device (such as a mobile phone), the digital signal processing may comprise audio processing, video processing or communication channel coding (as illustrated in FIG. 1).

In some applications, the signal processing may be strongly dependent. This is the case, for instance, in mobile telecom applications (2G and 3G) where the channel processing needs to share information and to be synchronized with the speech processing.

It is known to implement all the linked signals processing in a single unique DSP subsystem 6, as shown in FIG. 2. In such a case, there is no hardware limitation to sharing information between different concurrent processes (namely audio and telecom) since the processes are undertaken in the same DSP unit. However, a shared memory 8 and a direct memory Access (DMA) controller 9 is required for sub-system exchanges of information with the CPU.

By using a single combined DSP solution, a powerful CPU is required along with sophisticated real time embedded firmware. Consequently, implementation, validation and maintenance of such processing apparatus is complicated. Moreover, the dependencies between all the processes mean that the system is only mature when all of these processes are stable.

An alternative approach is to use two separate DSP units 10 and 12: one unit (DSP1) for the telecom processing and one unit (DSP2) for the Audio processing, as illustrated in FIG. 3. There is, however, a drawback associated with this alternative approach, in that information cannot be shared directly between the sub-systems.

SUMMARY OF THE INVENTION

According to the invention, there is provided processing apparatus for a portable communication device comprising: a central processing unit; first and second digital signal processing units; a first dual port memory unit adapted to store data shared between the central processing unit and the first digital signal processing unit; and a second dual port memory unit adapted to store data shared between the central processing unit and the second digital signal processing unit, and wherein the first dual port memory unit is adapted to store data shared between the first and second digital signal processing units without using the central processing unit.

Thus the invention can be used to share data between digital signal processing sub-systems without disturbing the central processing unit. Moreover, with the digital processing sub-systems being independent from each (in a hardware point of view), a sub-system can be modified/updated without taking into account the other sub-system, thereby facilitating integration, validation, maintenance and evolution of the processing apparatus.

The apparatus may further comprise a timer adapted to output a timing reference signal to the first and second digital signal processing units. This timer enables the synchronisation of the digital signal processing unit without the need for interruption signals, thereby allowing the digital signal processing to be completely independent.

Embodiments of the invention may be used in mobile communication devices (phones, laptops, PDA's, headsets . . . ).

Further, embodiments may enable the separate digital signal processing units to be synchronised to a signal or network. Thus, audio processing and communication channel coding may be synchronised, for example.

BRIEF DESCRIPTION OF THE DRAWINGS

Embodiments of the invention will now be described, purely by way of example, with reference to the accompanying drawings, in which.

Like reference numerals refer to like elements throughout.

DETAILED DESCRIPTION OF PREFERRED EMBODIMENTS

Embodiments of the invention provide a processing architecture for an integrated circuit that enables the sharing of data between DSP sub-systems without disturbing a CPU of the circuit. In such embodiments, shared memory units are situated between the CPU and the DSP unit to not only enable data sharing between the CPU and DSP units, but to also enable data sharing between the DSP units independently of the CPU.

Figure 1:
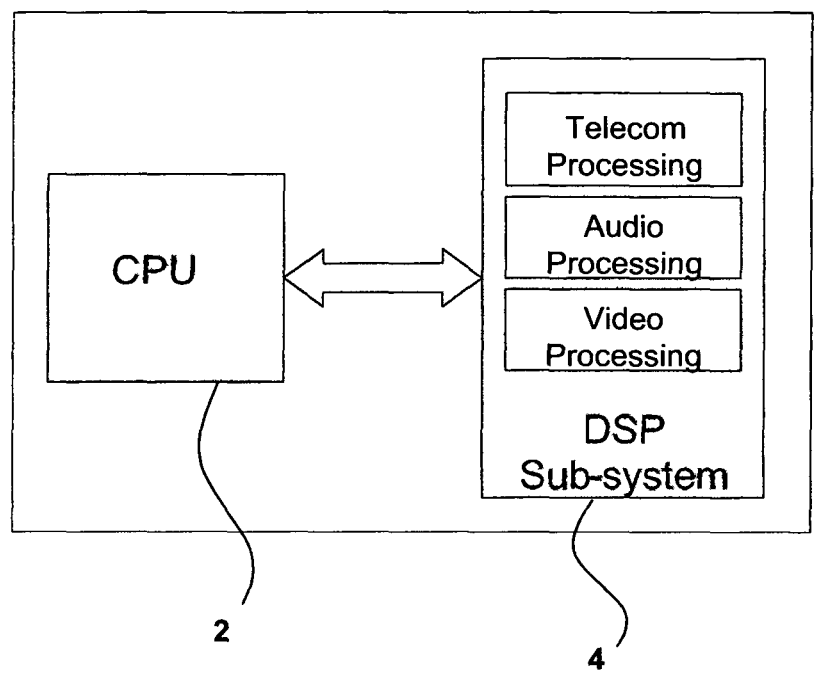
FIG. 1 is a block diagram of a conventional integrated circuit for a portable communication device.
Figure 2:
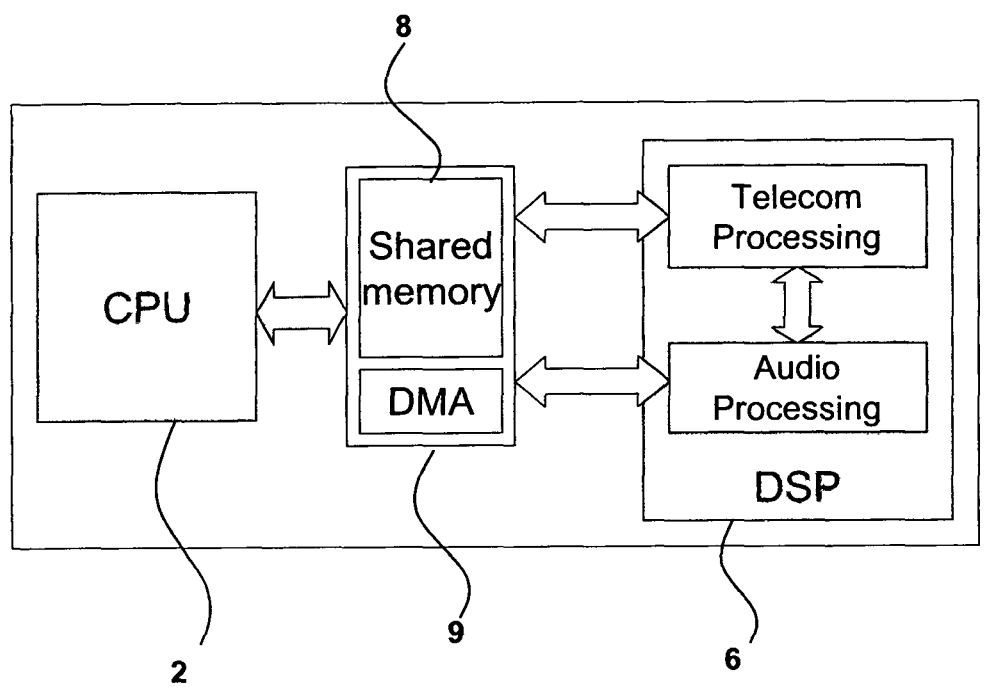
FIG. 2 is a block diagram of a conventional integrated circuit for a portable communication device, wherein a single unique DSP subsystem is provided for signal processing.
Figure 3:
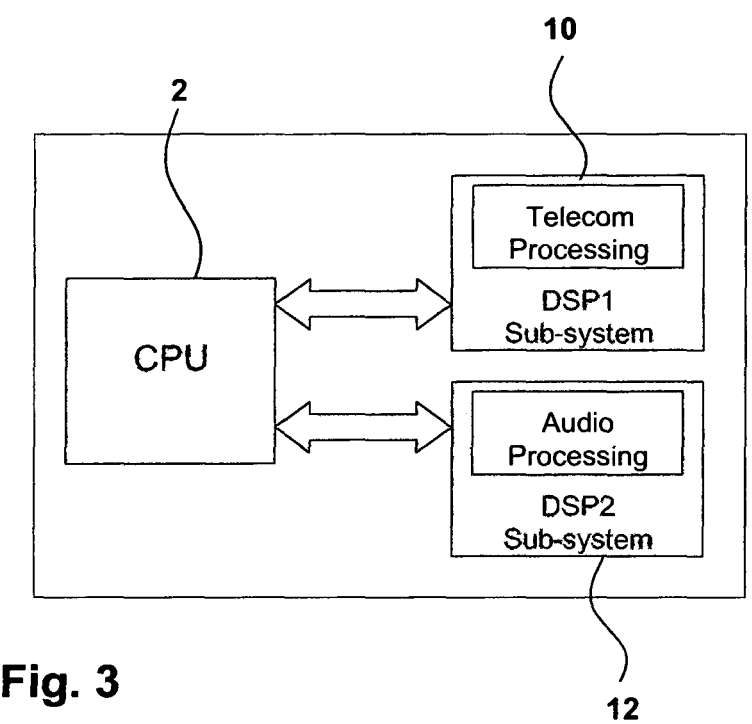
FIG. 3 is a block diagram of a conventional integrated circuit for a portable communication device, wherein two separate DSP units are provided (one unit being for telecom processing and one unit being for Audio processing)
Figure 4:
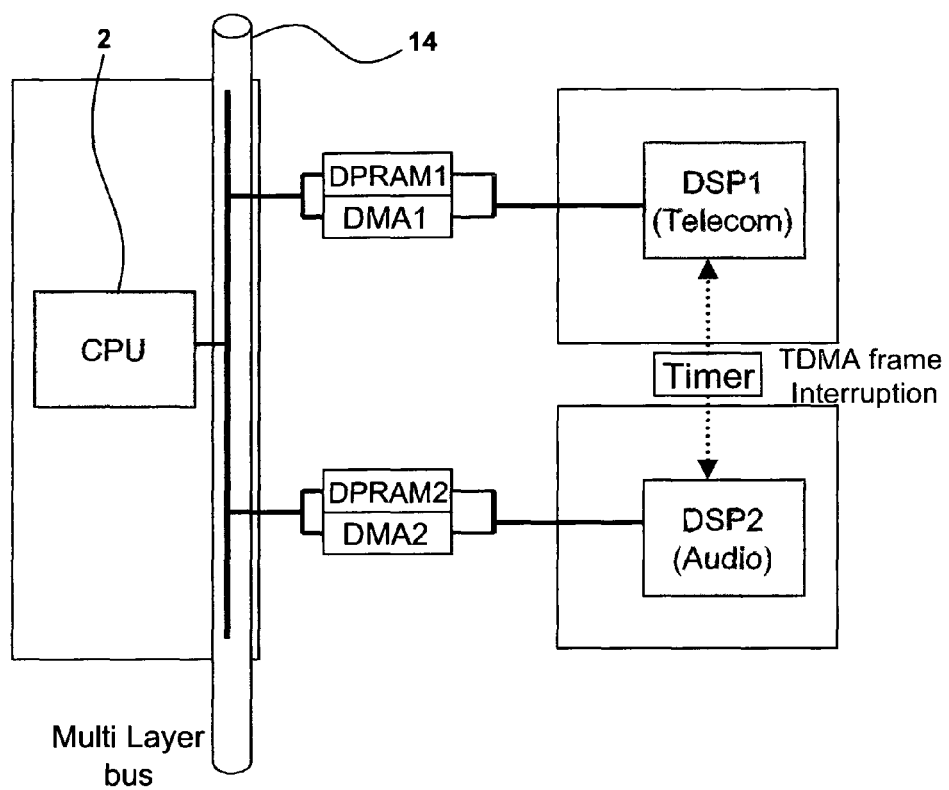
FIG. 4 is a block diagram of processing apparatus according to an embodiment of the invention.

Referring to FIG. 4, processing apparatus for a mobile phone according to an embodiment of the invention comprises a CPU 2 connected to a multi-layer communication bus 14; first (DSP1) and second (DSP2) digital signal processing units; a first dual port random access memory unit (DPRAM1) adapted to store data shared between the central processing unit and the first digital signal processing unit (DSP1); and a second dual port random access memory unit (DPRAM2) adapted to store data shared between the central processing unit and the second digital signal processing unit (DSP2).

The first (DSP1) and second (DSP2) digital signal processing units are separate from each other and dedicated to differing types of digital signal processing. Here, the first digital signal processing unit (DSP1) is specifically adapted and/or optimised for telecom processing and the second digital signal processing unit (DSP2) is specifically adapted and/or optimised for audio processing.

First (DMA1) and second (DMA2) direct access memory controllers are also provided to control access to data stored in the first (DPRAM1) and second (DPRAM2) dual port random access memory units, respectively. The direct access memory controllers allow the digital signal processing units to access the CPU memory area. Since both the first (DPRAM1) and second (DPRAM2) dual port random access memory units are in the CPU memory area, both the digital signal processing units can access the dual port random access memory units of the other.

The first dual port random access memory unit (DPRAM1) is coupled to the communication bus, the first direct access memory controller (DMA1); the first digital signal processing unit (DSP1); and the second dual port random access memory unit (DPRAM2). Further, the second dual port random access memory unit (DPRAM2) is coupled to the communication bus, the second direct access memory controller (DMA2), the second digital signal processing unit (DSP2); and the first dual port random access memory unit (DPRAM1).

In this way, the first dual port random access memory unit (DPRAM1) can store data shared between the first (DSP1) and second (DSP2) digital signal processing units without disturbing the CPU. By way of example, the first digital signal processing unit (DSP1) is provided with an address which points to a location in the CPU memory area where it is to write/read data, using the first direct access memory controller (DMA1). By making this address point to the second dual port random access memory unit (DPRAM2), the first digital signal processing unit (DSP1) will automatically access the second dual port random access memory unit (DPRAM2).

The first digital signal processing unit (DSP1) is arranged to be a master unit and the second digital signal processing unit (DSP2) is arranged to be a slave unit. Thus, the second digital signal processing unit (DSP2) can be independent from the first digital signal processing unit (DSP1).

For information sharing, the first digital signal processing unit (DSP1) can access the second dual port random access memory unit (DPRAM2) via the first direct access memory controller (DMA1) and a layer of the multi-layer communication bus (10). The first digital signal processing unit (DSP1) can therefore access data stored in the second dual port random access memory unit (DPRAM2) without accessing or using the CPU (i.e. without receiving instruction(s) from the CPU and/or accessing the processing means of the CPU).

Using the knowledge (from the respective dual port random access memory unit (DPRAM)) that each DSP unit shares some control registers and data buffers with the CPU, the information to be shared between the first (DSP1) and second (DSP2) digital signal processing units is stored in the second dual port random access memory unit (DPRAM2). In other words, to share information, the first (DSP1) and second (DSP2) digital signal processing unit only use data stored in the second dual port random access memory unit (DPRAM2).

It will also be seen from FIG. 4, that a timer is provided which outputs a timing reference signal to the first (DSP1) and second (DSP2) digital signal processing units. Here, the timer is synchronised to a communication network used by the mobile phone, and therefore provides a common interruption signal that is synchronized with the network (i.e. a TDMA frame of GSM).

The processing undertaken by the first digital signal processing unit (DSP1) is entirely scheduled according to the common interruption signal.

When speech processing needs to be undertaken by the second digital processing unit (DSP2) (i.e. when a GSM speech call needs to be handled), the speech processes running on the second digital processing unit (DSP2) must be started according to interruption signal so that is synchronised with the telecom processes. A counter value (called a T2 counter) is also used to synchronise the speech processing with the telecom processing. This T2 counter is known by the first the digital signal processing unit (DSP1), which can be adapted to send the T2 counter to the second digital signal processing unit (DSP2)

For all other processes not requiring speech processing (i.e. multimedia communications not including GSM speech), the second digital signal processing unit (DSP2) does not care of the common interruption signal and can be switched off.

Thus, it will be understood that the first digital signal processing unit (DSP1) performs processing which requires continuous synchronisation to the communication network, whereas the second digital signal processing unit (DSP2) performs processing only intermittently, but when processing is performed such processing can be synchronised to the communication network.

To ensure data is present when needed, a semaphore mechanism is used. For instance, some registers in the second dual port random access memory unit (DPRAM2) are overwritten by the first digital signal processing unit (DSP1) once it has transferred some data and the second digital signal processing unit (DSP2) checks these registers before processing the data. Use of the above mechanism is, however, only as a fail-safe since a correctly programmed architecture is completely predictable.

It is to be appreciated that the first (DSP1) and second (DSP2) digital signal processing units can operate independently of each other. The CPU is able to statically provide addresses of the second dual port random access memory unit (DPRAM2) to the first digital signal processing unit (DSP1), via the first dual port random access memory unit (DPRAM1) registers.

A few registers are used by both of the DSP units (read access in one side and write access in the other). Their definitions are frozen. Based on this, each firmware unit can evolve independently without taking into account the other one.

When employed in GSM mobile phones, embodiments enable audio and telecom processes to be synchronised on two separate DSP units. Thus, with audio processing separated from GSM telecom processing, it can easily be re-used for other telecom standards (e.g. UMTS or VoIP) or other audio applications (e.g. multimedia).

Furthermore, to enable debugging of the synchronization mechanism, the CPU can play the role of the first (DSP1) or second (DSP2) digital signal processing units. Each DSP sub-system may therefore tested independently. As a consequence, once one of the sub-systems is mature (especially telecom), it need not be disturbed by modification or evolution of the other subsystem, which may need to be scalable and/or respond to commercial requirements for example.

Embodiments of the invention enable the DSP subsystems to share information and/or be synchronised without use of the CPU. Thus, the DSP subsystems can even operate while the CPU is in a power conservation or sleep mode.

The invention also enables development of the subsystems to be separated, thereby facilitating enhancements, integration, validation and support. Investigations have shown that investigation of bugs/errors on the customer side is easier if we can concentrate efforts on a single processing subsystem (such as Telecom or Audio), without having to consider highly complicated use cases.

Partitioning of processes between processors, and partitioning of shared memory, simplifies software development, readily enabling different teams to develop software for the different sub-systems (CPU, DSP1 & DSP2). Software for one subsystem may be enhanced whilst having a minimal impact on the software of the other subsystems.

It should be noted that the above-mentioned embodiments illustrate rather than limit the invention, and that those skilled in the art will be capable of designing many alternative embodiments without departing from the scope of the invention as defined by the appended claims.

For example, the embodiment of FIG. 4 has been described with reference to the case of a GSM mobile phone, but other embodiments can be readily developed for other mobile standards (such as 2G, 3G or VoIP).

The invention claimed is:

1. A processing apparatus for a portable communication device, comprising:
a central processing unit;
first and second digital signal processing units;
a first dual port memory unit being in the CPU memory area and adapted to store data shared between the central processing unit and the first digital signal processing unit;
a second dual port memory unit being in the CPU memory area and adapted to store data shared between the central processing unit and the second digital signal processing unit, wherein the first dual port memory unit is adapted to store data shared between the first and second digital signal processing without using the central processing unit;
first and second direct access memory controllers adapted control access to data stored in the first and second dual port memory units, respectively, each of said direct access memory controllers allowing the corresponding digital signal processing units to access the CPU memory area so as to access the dual port random access memory units of the other; and
a communication bus connected to the central processing unit,
wherein the first dual port memory unit is coupled to the communication bus, the first direct access memory controller, the first digital signal processing unit, and the second dual port memory unit,
wherein the second dual port memory unit is coupled to the communication bus, the second direct access memory controller, the second digital signal processing unit, and the first dual port memory unit, and
wherein the communication bus is configured to transfer data between the first and second digital signal processing units.

2. The apparatus of claim 1, further comprising a timer adapted to output a timing reference signal to the first and second digital signal processing units.

3. The apparatus of claim 2, wherein the timer is synchronized to a communication network.

4. The apparatus of claim 3, wherein the first digital signal processing unit is adapted to perform processing which requires continuous synchronization to the communication network.

5. The apparatus according to claim 4, wherein the second digital signal processing unit is adapted to perform processing which are not continuously performed but which, when performed, require synchronization to the communication network.

6. The apparatus of claim 1, wherein the second digital signal processing unit is adapted to be switched off when not in use.

7. An electronic device, comprising:
a central processing unit;
first and second digital signal processing units coupled to the central processing unit;
a first dual port memory unit being in the CPU memory area and adapted to store data shared between the central processing unit and the first digital signal processing unit;
a second dual port memory unit adapted to store data shared between the central processing unit and the second digital signal processing unit, wherein the first dual port memory unit is adapted to store data shared between the first and second digital signal processing;
first and second direct access memory controllers adapted to control provide access to data stored in the first and second dual port memory units, respectively, each of said direct access memory controllers allowing the corresponding digital signal processing units (DSP1, DSP2) to access the CPU memory area so as to access the dual port random access memory units of the other; and
a communication bus connected to the central processing unit, wherein the first dual port memory unit is coupled to the communication bus, the first direct access memory controller, the first digital signal processing unit, and the second dual port memory unit, wherein the second dual port memory unit is coupled to the communication bus, the second direct access memory controller, the second digital signal processing unit, and the first dual port memory unit, wherein the communication bus is configured to transfer data between the first and second digital signal processing units.

8. The electronic device of claim 7, wherein the electronic device is a portable communication device.

9. A method of processing data in apparatus, wherein the apparatus comprises a central processing unit; first and second digital signal processing units; first and second dual port memory units; first and second direct access memory controllers being in the CPU memory area and adapted to control access to data stored in the first and second dual port memory units, respectively; and a communication bus connected to the central processing unit, wherein the first dual port memory unit is coupled to the communication bus, the first direct access memory controller, the first digital signal processing unit, and the second dual port memory unit, and wherein the second dual port memory unit is coupled to the communication bus, the second direct access memory controller, the second digital signal processing unit, and the first dual port memory unit, the method comprising:
storing data shared between the central processing unit and the first digital signal processing unit in the first dual port memory unit;
storing data shared between the central processing unit and the second digital signal processing unit in the second dual port memory unit; and
storing data shared between the first and second digital signal processing units without using the central processing unit by storing the shared data in the second dual port memory unit through the use of direct access memory controllers associated to each of said first and second DSP and allowing the latter to access the CUP memory area; and transferring data between the first and second digital signal processing units using the communication bus.

10. The method of claim 9, further comprising switching off the second digital signal processing unit when not in use.

11. The method of claim 9, further comprising of outputting a timing reference signal to the first and second digital signal processing units.

12. The electronic device of claim 9, wherein the first digital signal processing unit is a master unit.

13. The electronic device of claim 9, wherein the second digital signal processing unit is a slave unit.

14. The electronic device of claim 9, further comprising a timer adapted to output a timing reference signal to the first and second digital signal processing units.

15. The electronic device of claim 14, wherein the timer is synchronized to a communication network.

* * * * *